United States Patent [19]

Gould

[11] 4,156,066

[45] May 22, 1979

[54] POLYURETHANE POLYMERS CHARACTERIZED BY LACTONE GROUPS AND HYDROXYL GROUPS IN THE POLYMER BACKBONE

[75] Inventor: Francis E. Gould, Princeton, N.J.

[73] Assignee: Tyndale Plains - Hunter Ltd., Princeton, N.J.

[21] Appl. No.: 809,260

[22] Filed: Jun. 23, 1977

[51] Int. Cl.$^2$ ............................................. C08G 18/34
[52] U.S. Cl. ................................. 528/73; 106/15.05; 204/159.19; 424/32; 424/78; 428/425
[58] Field of Search ................. 260/77.5 AN, 77.5 R, 260/77.5 AP, 77.5 CR; 528/73; 204/159.19; 428/425; 106/15 R; 424/78, 32

[56] References Cited

U.S. PATENT DOCUMENTS

| | | | |
|---|---|---|---|
| 2,962,524 | 11/1960 | Hostettler et al. | 260/77.5 AN |
| 3,025,269 | 3/1962 | Calfee | 260/77.5 CR |
| 3,412,054 | 11/1968 | Milligan et al. | 260/29.2 TN |
| 3,461,103 | 8/1969 | Keberle et al. | 260/85.9 R |
| 3,993,627 | 11/1976 | Sekmakas et al. | 260/47 CB |

*Primary Examiner*—Maurice J. Welsh
*Attorney, Agent, or Firm*—Robert W. Kell

[57] ABSTRACT

Polyurethane polymers characterized by a molecular weight above 6,000 and having lactone groups and hydroxyl groups in the polymer backbone are prepared by reacting a mixture of polyglycols proportioned so as to provide the desired polymer properties, a polyfunctional lactone and a polyfunctional isocyanate. The product is soluble in alkaline solutions and may be used for light sensitive photographic layers on films, paper or glass; in drug delivery systems, as burn dressings, in body implants such as vascular prosthesis, and in the manufacture of catheters. The novel polymers also find use in the manufacture of artificial finger nails, finger cots, adhesives, and in protective and hydrostatic drag resistant coatings. The water absorptivity of the polyurethane lactone polymers is above 10%, preferably above 20%, and these polymers may range to completely gel-like high water absorptive polymers. The polymers of the present invention can provide a leachable substrate wherein the leaching agent may be water, gases, alcohols, esters and body fluids, e.g., animal or human.

34 Claims, No Drawings

POLYURETHANE POLYMERS CHARACTERIZED BY LACTONE GROUPS AND HYDROXYL GROUPS IN THE POLYMER BACKBONE

This invention pertains to lactone modified hydrophylic polyurethane resins that are insoluble in water, but which swell in water and other solvents. More particularly, the present invention relates to polyether urethane resins having active and available lactone groups in the polymer backbone that readily open and dissolve in alkaline solutions to produce carboxylates which can be converted to free carbonyl groups. Typically they are low-melting solids, generally having flow points in the range of 90° C. to 250° C. which can be fabricated by typical polymer procedures.

Numerous polymer systems that contain free carboxylic acid groups are known in the art. It is difficult, however, to prepare a polyurethane that has free carboxylic acid groups for the reason that the isocyanate that is a necessary component in any polyurethane system is quite reactive with carboxylic acid groups.

One approach to the introduction of carboxylic acid groups into a polyurethane resin chain is described in U.S. Pat. No. 3,412,054. In accordance with that method, a 2,2-di(hydroxymethyl) alkanoic acid such as 2,2-di(hydroxymethyl) propionic acid is reacted with an organic diisocyanate to produce a polyurethane containing unreacted carboxylic acid groups.

The polyurethanes of the present invention may be made by the reaction of an organic polyisocyanate with (i) a long chain polyoxyalkylene diol such as polyethylene-glycol or polypropylene glycol and (ii) a polyfunctional lactone having the formula:

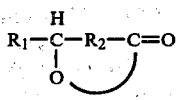

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—, m being an integer from 3 to 10. Representative examples of the above lactones are those derived from polysacharides and monosacharides such as mannolactone, delta gluconolactone, sorbolactone and D-glucuronolactone.

It will be noted from the above formula that the lactones employed have at least 3 hydroxyl groups in the molecule or at least 1 more than are required to form a linear polyurethane chain. These free (unreacted) hydroxyl groups remain in the polymer backbone and are available for cross-linking the polymer. The lactone ring is also reactive and may be opened, i.e., by hydrolysis, to form carboxylate groups and carboxyl groups in the polymer backbone.

The polyisocyanate used in the present invention may be represented by R(NCO)$_n$ wherein n is greater than 1, preferably 2-4, and R is an aliphatic, alicyclic, aliphatic-alicyclic, aromatic, or aliphatic-aromatic hydrocarbon compound of from 4 to 26 carbon atoms, but more conventionally from 6 to 20 and generally from 6 to 13 carbon atoms. Representative examples of the above isocyanates are: tetramethylene diisocyanate; hexamethylene diisocyanate; trimethylhexamethylene diisocyanate; dimer acid diisocyanate; isopherone diisocyanate; diethylbenzene diisocyanate; decamethylene 1,10-diisocyanate; cyclohexylene 1,2-diisocyanate and cyclohexylene 1,4-diisocyanate; and the aromatic isocyanates such as 2,4-and 2,6-tolylene diisocyanate; 4,4-diphenylmethane diisocyanate; 1,5-naphthalene diisocyanate; dianisidine diisocyanate; tolidine diisocyanate; a polymeric polyisocyanate such as neopentyl tetra isocyanate; m-xylylene diisocyanate; tetrahydronaphthalene-1,5 diisocyanate; and bis(4-isocyanatophenyl) methane.

The preferred isocyanate is methylene di(cyclohexyl isocyanate). Other but slightly less preferred diisocyanates are trimethyl hexamethylene diisocyanate and isophorone diisocyanate.

The long-chain, water-soluble polyglycol should have a molecular weight of at least about 200 and preferably 1450 to 6000 or more and should consist predominantly of oxyethylene or oxypropylene groups, though a minor proportion of other oxyalkylene groups may be included. Block copolymer polyols obtained by adding ethylene oxide to a polyoxypropylene chain are also useful.

The number of carboxylic groups that are present in the polymer chain will be determined by the amount of lactone that is present in the reaction mixture which may be varied from 0.1% to 30% of the weight of the total reaction mixture. Preferably the weight of the lactone will be 0.5% to 15% of the weight of the total reaction mixture.

In the manufacture of the polyurethane resins of the present invention, low molecular weight glycols such as diethylene glycol and dipropylene glycol or an aromatic glycol may be added to the reaction mixture. The preferred low molecular weight aromatic polyols are bisphenol A and 4,4′-sulfonyldiphenol.

The proportions in which the long chain polyglycol and the low molecular weight glycol, i.e., diethylene glycol are used depends on the hydrophobic-hydrophilic balance present in each and desired in the final product. Increasing the molecular weight of the long chain polyoxyalkylene glycol and/or the amount of this component contributes strong hydrophilic properties to the final product. This effect may be counter-balanced by increasing the proportion of low molecular weight glycol, i.e., diethylene glycol or dipropylene glycol.

Keeping the above in mind (that it is the number of polyalkylene oxide groups in the polymer molecule that determines hydrophilic properties and the polyethylene oxide groups are more hydrophylic than are polypropylene oxide groups) it is a simple matter to choose mixtures of reactants such that the final product will have the desired properties. By choosing the molecular weight of the polyalkylene glycol or using two polyalkylene glycols of different molecular weight one may "tailor make" products that satisfy a wide range of properties.

In making the polyurethane resins of this invention the glycols are mixed with the lactone and the polyisocyanate is reacted with the mixture although other techniques may be used. The reaction is catalyzed by known catalyst for such reaction, suitable ones being tin salts and organic tin esters such as dibutyl tin dilaurate, tertiary amines such as triethyl diamine (DABCD), N,N,N′,N′-tetramethyl-1,3-butane diamine and other recognized catalysts for urethane reactions which are well known in the art. The reaction can be conducted in the absence or presence of dilutent or solvent.

The polyurethane polyether resins of the present invention because of their unique physical properties may advantageously be used as burn dressings. The resin may be applied to the burn as a powder, film, or from solution in a volatile non toxic solvent and will form a barrier that is permeable to liquids. Thus the physician has a choice of medicaments which may be applied to the burn prior to the resin coating or may be added to the resin for timed release. A particularly advantageous burn dressing is a powder obtained by the low temperature grinding of from about 1 to about 80 parts by weight of polyvinylpyrolidone-iodine with about 20 to about 99 parts by weight of polyether polyurethane resins having free hydroxyl and carboxylate groups in the polymer backbone.

The above described polyurethane polyether resins are also useful as absorbents, ion exchange resins, and in the manufacture of dentures, cannulae, artificial finger nails, finger cots, adhesives, and in protective and drag resistant coatings.

The practice of the invention is further illustrated by the following examples without being restricted thereto, the parts being by weight.

EXAMPLE 1

A diethylene glycol solution of polyethylene glycol is prepared by heating 109.2 parts (0.075 mole) of polyethylene glycol having a molecular weight of 1450 in 17.4 parts (0.164 mole) of diethylene glycol with stirring. The solution is cooled to below 60° C. and to it is added a solution of delta gluconolactone prepared by dissolving 11.6 parts (0.065 mole) of delta gluconolactone in 46.4 parts of dimethyl sulfoxide. Eighty and eight tenths parts (0.316 mole) of methylene bis cyclohexyl-4,4'-isocyanate (a product identified as HYLENE W sold by E. I. DuPont de Nemours & Co., Wilmington, Delaware) is added to the mixture with stirring. One half part by weight of an organic tin catalyst solution; dibutyl tin dilaurate (a product identified as $T_{12}$ manufactured by Metal and Thermite Company of Rahway, New Jersey) is added to the reaction mixture with stirring at a temperature below 45° C. to avoid undue temperature rise caused by the heat of reaction. After stirring for 20 minutes, the temperature increases to 80° C. The reaction mixture is then transferred to a tray and placed in an oven at 90° C. for 1 hour to complete the reaction.

EXAMPLE 2

A polymer that is insoluble in water but soluble in a mixture of a major portion of alcohol and a minor portion of aqueous base (1.0 N sodium hydroxide) is prepared by the method described in Example 1 from:

| | |
|---|---|
| Polyethylene Glycol (M. Wt. 1450) | 3469 parts (2.37 mole) |
| Diethylene Glycol | 254 parts (2.39 mole) |
| Delta Gluconolactone (as a 20% solution in dimethyl sulfoxide) | 116 parts (0.65 mole) |
| HYLENE W | 808 parts (3.16 mole) |
| Dibutyl tin dilaurate | 5 parts |

A piece of this polymer, cast in the form of a cylinder having a volumn of 10 ml. is weighed, emersed in water at room temperature for 12 hours, dried with a paper towel to remove surface moisture and again weighed. The increase in weight was 100%.

EXAMPLE 3

A polymer containing lactone groups that is soluble in a major portion of alcohol having a minor amount of base dissolved therein, or added with a minor amount of water or other carrier is prepared by the method described above in Example 1 from:

| | |
|---|---|
| Polyethylene Glycol (M. Wt. 1450) | 2000 parts (1.37 mole) |
| Diethylene Glycol | 107.5 Parts (1.64 mole) |
| Delta Gluconolactone (as 20% solution in dimethyl sulfoxide) | 116 parts (0.65 mole) |
| HYLENE W | 808 parts (3.16 mole) |
| Stannous Octoate ($T_9$)* | 5 parts |

*$T_9$ is a trademark of the Metal and Thermite Company of Rahwa, New Jersey.

EXAMPLE 4

This example illustrates the preparation of a polymer soluble in alkaline solutions using a 5% excess of cyanate groups. The method of preparation is described in Example 1.

| | |
|---|---|
| Polyethylene Glycol (mol. wt. 1450) | 1097 parts (0.75 mole) |
| Diethylene Glycol | 174 parts (1.64 mole) |
| Delta Gluconolactone (as a 20% solution in dimethyl sulfoxide) | 116 parts (0.65 mole) |
| HYLENE W | 102.4 parts (0.4 mole) |
| Stannous Octoate ($T_9$)* | 5 parts |

*$T_9$ is a trademark of the Metal and Thermite Company of Rahway, New Jersey.

EXAMPLE 5

Fifty grams of the polyurethane polyether resin described above in Example 1 is added to 500 ml of an aqueous solution containing 17.4 ml of 29% ammonium hydroxide. The solution is stirred at 90° C. until all of the polymer dissolves. To the polymer solution is added 10 ml of an aqueous 20% solution of ammonium dichromate [2.0 g $(NH_4)_2Cr_2O_4$]. The solution is applied to cellulose acetate film with a doctor knife and dried at room temperature in subdued light or darkness. A tough film of the photosensitive complex, light yellow in color, is deposited that adheres well to the cellulose acetate substrate. A photographic image is projected onto the film using a S-1 sun lamp as the light source and an exposure time of 60 seconds. The film is developed by washing in water at room temperature to dissolve and remove the unexposed and uncross-linked portion of the photographic image. Since the polymer that forms the photographic image is substantative to ink the developed film may be used in lithography printing processes.

EXAMPLE 6

An anti-fouling marine paint is formulated by grinding in a ball mill for three hours:

| | |
|---|---|
| Polyurethane resin of Example 2 | 150 parts |
| Five percent ammonium hydroxide in ethanol | 500 parts |
| Potassium dichromate | 2 parts |
| Titanium dioxide | 50 parts |
| Mercury acetate | 3 parts |

The product so obtained may be applied to wood and other surfaces to form a film that is cross-linked by sun light to an adherent insoluble protective coating. The product is particularly effective when applied to the hull of a boat as a hydrophylic nature of the urethane resins permits the slow release of the mercury salts and prevents barnacle or algae formation on the painted surfaces.

EXAMPLE 7

A polyurethane polyether resin is prepared by the method described in Example 1 above substituting for the polyethylene glycol a block copolymer having a molecular weight of 4750 obtained by adding poly(oxyethylene) groups to a poly(oxypropylene) chain having a molecular weight of 950.

| Block copolymer (M. Wt. 4750) | 3577 parts |
|---|---|
| Diethylene glycol | 174 parts |
| Delta gluconolactone (as a 20% solution in dimethyl sulfoxide) | 116 parts |
| HYLENE W | 808 parts |
| Dibutyl tin dilaurate | 5 parts |

EXAMPLE 8

A polyurethane polyether resin is prepared by the method described in Example 1 above substituting for the polyethylene glycol a block copolymer having a molecular weight of 7500 obtained by adding poly(oxyethylene) groups to a poly(oxypropylene) chain having a molecular weight of 2250.

| Block copolymer (M. Wt. 7500) | 1157.4 parts |
|---|---|
| Diethylene Glycol | 32.75 parts |
| Delta gluconolactone (as a 20% solution in dimethyl sulfoxide) | 116 parts |
| HYLENE W | 808 parts |
| Dibutyl tin dilaurate | 5 parts |

EXAMPLE 9

A polyurethane polyether resin is prepared by the method described in Example 1 above substituting for the polyethylene glycol a block copolymer having a molecular weight of 6500 obtained by adding poly(oxyethylene) groups to a poly(oxypropylene) chain having a molecular weight of 3250.

| Block copolymer | 325 parts |
|---|---|
| Diethylene glycol | 21.76 parts |
| Delta gluconolactone (as a 20% solution in dimethyl sulfoxide) | 41.41 parts |
| HYLENE W | 132 parts |
| Dibutyl tin dilaurate | 0.5 parts |

EXAMPLE 10

A polyurethane polyether resin is prepared by the method described in Example 1 above substituting for the polyethylene glycol a block copolymer having a molecular weight of 13,333 obtained by adding poly(oxyethylene) groups to a poly(oxypropylene) chain having a molecular weight of about 4000.

| Block copolymer | 1004 parts |
|---|---|
| Diethylene glycol | 17.4 parts |
| Delta gluconolactone* | 11.6 parts |
| Dimethyl sulfoxide | 46.4 parts |
| HYLENE W | 80.8 parts |
| Dibutyl tin dilaurate | 3 parts |

After stirring for one hour, the reaction mixture is transferred to a tray and placed in an oven at 90° C. overnight.

EXAMPLE 11

A series of three polyurethane polyether resins is prepared by the procedure of Example 1 in which the amount of Delta glucano-lactone is varied.

| Polyethylene glycol (M. Wt. 1450) | Diethylene glycol | Delta glucono-lactone* | HYLENE W | Dibutyl tin dilaruate |
|---|---|---|---|---|
| Resin (a) 54.6 | 8.7 | 2.9 | 40.4 | 0.5 |
| Resin (b) 54.6 | 8.7 | 5.8 | 40.4 | 0.5 |
| Resin (c) 54.6 | 8.7 | 11.6 | 48.5 | 0.5 |

*dissolved in dimethyl sulfoxide

After the initial reaction, instead of curing the resin in an oven the three resins (3 g. of each) were mixed with 100 mg of norethandrolone (Nilevar), cast in the form of cylinders 1.3 cm by 2.5 cm and polymerized at 80° C. for 30 hours. After removing from the mold, cylinders suitable for in vivo implantation to provide prolonged release of the norethandrolone (Nilevar) are obtained for use in animal husbandry.

EXAMPLE 12

Delta glucanolactone (14.28 parts) is ground to a fine powder and thoroughly mixed with 29.15 parts of polyethylene glycol (M. Wt. 200). The mixture is heated to 60° C. and to it is added 56.57 parts of HYLENE W and 0.5 parts of stannous octoate with stirring. After the exothermic reaction subsides, the resin is transfered into a tray and placed in an oven at 90° C. for one hour to complete the reaction.

EXAMPLE 13

Polyethylene glycol of molecular weight 1450 (218.4 parts) is mixed with 34.8 parts of diethylene glycol and the mixture is heated with stirring to the melting point. To this melt is added 161.6 parts of HYLENE W.

A solution of delta gluconolactone is prepared by dissolving 23.2 parts of delta gluconolactone in 77 parts of dimethyl sulfoxide. The delta gluconolactone solution is added to the mixture of glycols and HYLENE W with stirring and the reaction mixture is cooled to 50° C. Eight tenths parts of dibutyl tin dilaurate catalyst is added to the reaction mixture, and stirring is continued until the exothermic reaction subsides. The resin is then cured in an oven at 90° C. for one hour.

The cured resin (2.6 parts) is dissolved in alkaline methanol (7.4 parts) and 2.5 parts of a 2% aqueous ammonium dichromate solution is added. The dichromate catalyzed resin solution is poured through a 5 mm pyrex glass tube 4 feet in length to form a uniform coating on the interior surface thereof. The coating is air dried in ambient light for 5 minutes.

One end of the coated tube is closed with a cork pierced by a fine hypodermic needle. The tube is filled with tap water and then inverted to permit the tap water to drain out. The time required for all water to drain from the tube was 24 seconds. The experiment was repeated ten times. The time required for the tube to drain was always 24±1 seconds.

In a control experiment an uncoated 5 mm pyrex tube 4 feet in length is washed thoroughly with a detergent solution, rinsed with distilled water and air dried. The tube is closed with the same cork pierced by a fine hypodermic needle referred to above and filled with tap water. When this uncoated tube is inverted (10 trials) it required 38±1 seconds for the water to drain from the tube.

The dichromate catalyzed resin composition described above in this example is applied to the hull and center-board of a Lightning Class sailboat and exposed to the sunlight for 6 minutes to cross-link the coating. In a light breeze the sailboat outperforms other boats in her class.

What is claimed is:

1. A polyurethane polyether resin having lactone groups in the polymer backbone.

2. The polyurethane polyether resin of claim 1 having hydroxyl groups in the polymer backbone.

3. A polyurethane polyether resin characterized by a molecular weight above 6000 and having lactone groups in the polymer backbone, said urethane polymer comprising the reaction product of:
   (a) a polyfunctional lactone selected from the group consisting of (1) lactones having the formula:

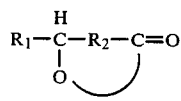

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 3 to 10 and (2) D-glucuronolactone;
   (b) a polyalkylene oxide glycol; and
   (c) an organic polyisocyanate;
said urethane polymer being soluble in alkaline solutions.

4. The polyurethane polyether resin of claim 3 wherein said lactone is delta gluconolactone.

5. The polyurethane polyether resin of claim 3 wherein said lactone is mannolactone.

6. The polyurethane polyether resin of claim 3 wherein said lactone is sorbolactone.

7. The polyurethane polyether resin of claim 3 wherein said lactone is D-glucuronolactone.

8. The polyurethane polyether resin of claim 3 wherein said polyalkylene oxide is polyethylene glycol having a molecular weight of 1450.

9. The polyurethane polyether resin of claim 3 wherein said polyalkylene oxide glycol is a mixture of polyethylene glycol and diethylene glycol.

10. The polyurethane polyether resin of claim 3 wherein said polyalkylene glycol is a block copolymer polyol characterized by a molecular weight of about 4750; said block copolymer polyol being obtained by adding poly(oxyethylene) groups to a poly(oxypropylene) chain having a molecular weight of about 950.

11. The polyurethane polyether resin of claim 3 wherein said polyalkylene glycol is a block copolymer polyol characterized by a molecular weight of about 7500; said block copolymer polyol being obtained by adding poly(oxyethylene) groups to a poly(oxypropylene) chain having a molecular weight of about 2250.

12. The polyurethane polyether resin of claim 3 wherein said polyalkylene glycol is a block copolymer polyol characterized by a molecular weight of about 6510; said block copolymer polyol being obtained by adding poly(oxyethylene) groups to a poly(oxypropylene) chain having a molecular weight of about 2250.

13. The polyurethane polyether resin of claim 3 wherein said polyalkylene glycol is a block copolymer polyol characterized by a molecular weight of about 13,333; said block copolymer polyol being obtained by adding poly(oxyethylene) groups to a poly(oxypropylene) chain having a molecular weight of about 4000.

14. The polyurethane polyether resin of claim 3 wherein said polyalkylene oxide glycol is polypropylene glycol.

15. The polyurethane polyether resin of claim 3 wherein said polyisocyanate is methylene di(cyclohexylisocyanate).

16. The polyurethane polyether resin of claim 3 wherein said polyalkylene oxide is a polyethylene oxide having a molecular weight in the range of 200 to 13,333.

17. A polyurethane polyether resin obtained by reacting a mixture of polyethylene glycol, diethylene glycol, delta gluconolactone and methylene di(cyclohexylisocyanate) in the presence of a catalyst.

18. The polyurethane polyether resin of claim 17 obtained by reacting a mixture of about 54.6 parts of polyethylene glycol (M. Wt. 1450), about 8.7 parts of diethylene glycol, about 5.8 parts of delta gluconolactone and about 40.4 parts of methylene di(cyclohexylisocyanate) in the presence of about 0.5 parts dibutyl tin dilaurate.

19. A carrier system comprising an active agent and a hydrophilic polymer as a carrier vehicle therefore, said carrier vehicle comprising a polyurethane polyether resin having free hydroxyl groups and carboxylate groups in the polymer backbone.

20. In a method for releasing an active agent in a medium in which said active agent is used the improvement comprising:
   incorporating said active agent in a polyurethane polyether resin having free hydroxyl groups and carboxylate groups in the polymer backbone;
   exposing said polyurethane with said active agent to said medium; and
   releasing said active agent into said medium at a predetermined rate.

21. The method of claim 20 wherein the medium is water.

22. The method of claim 20 wherein the medium is a body fluid.

23. The method of claim 20 wherein the medium is a gas.

24. The method of claim 23 wherein said gas is air.

25. A photosensitive coating composition comprising an alkaline solution of a polyurethane polyether resin having free hydroxyl groups and carboxylate groups in the polymer backbone and a catalyst which accelerates the cross-linking of said resin when exposed to light.

26. The coating composition of claim 25 wherein the catalyst is ammonium dichromate.

27. A photosensitive film comprising a layer of a dichromate catalysed polyurethane polyether resin having free hydroxyl groups and carboxylate groups in the polymer backbone supported on a substrate to which it adheres.

28. A method of protecting and reducing the hydrostatic drag of a surface which comprises applying thereto a coating of a catalysed polyurethane polyether resin having free hydroxyl groups and carboxylate groups in the polymer backbone and exposing said resin coating to light.

29. A hydrostatic drag resistant coating composition comprising an alkaline solution of a polyurethane polyether resin having free hydroxyl groups and carboxylate groups in the polymer backbone and a catalyst that accelerates the cross-linking of said resin when exposed to light.

30. The coating composition of claim 29 having present therein an effective amount of an anti-fouling agent.

31. A composition useful in the treatment of burns comprising from about 1 to about 80 parts by weight of polyvinylpyrolidone-iodide and from about 20 to about 99 parts by weight of a polyether polyurethane resin having free hydroxyl and carboxylate groups in the polymer backbone.

32. A burn dressing comprising a film of a polyurethane polyether resin having carboxylate groups and hydroxyl groups in the polymer backbone.

33. A burn dressing comprising a polyurethane polyether resin having carboxylate groups and hydroxyl groups in the polymer backbone, said polyurethane polyether resin being in the form of a finely divided powder.

34. A method of treating burns which comprises applying thereto from solution in a non-toxic solvent a polyurethane polyether resin having carboxylate groups and hydroxyl groups in the polymer backbone.

* * * * *

UNITED STATES PATENT AND TRADEMARK OFFICE
CERTIFICATE OF CORRECTION

PATENT NO. : 4,156,066
DATED : May 22, 1979
INVENTOR(S) : Francis E. Gould

It is certified that error appears in the above-identified patent and that said Letters Patent are hereby corrected as shown below:

Column 1, line 40, "$CHNH_2$," should read --$CH_2NH_2$,--
Column 7, line 26, "$CHNH_2$," should read --$CH_2NH_2$,--.

Signed and Sealed this

Fifth Day of February 1980

[SEAL]

Attest:

SIDNEY A. DIAMOND

Attesting Officer  Commissioner of Patents and Trademarks